(12) United States Patent
Cessac (10) Patent No.: US 8,784,010 B1
(45) Date of Patent: Jul. 22, 2014

(54) OILFIELD ROAD CROSSING

(71) Applicant: Alan Cessac, Franklin, TX (US)

(72) Inventor: Alan Cessac, Franklin, TX (US)

( * ) Notice: Subject to any disclaimer, the term of this patent is extended or adjusted under 35 U.S.C. 154(b) by 0 days.

(21) Appl. No.: 13/741,495

(22) Filed: Jan. 15, 2013

Related U.S. Application Data (60) Provisional application No. 61/590,022, filed on Jan. 24, 2012.

(51) Int. Cl.
*F16L 3/00* (2006.01)
*A62C 33/06* (2006.01)
*F16L 9/02* (2006.01)

(52) U.S. Cl.
CPC .......................................... *F16L 9/02* (2013.01)
USPC ............ 405/184.4; 405/157; 404/15; 14/69.5

(58) Field of Classification Search
CPC .......... A62C 33/06; E01F 9/047; F16L 25/00; F16L 25/009
USPC ..................... 405/157, 184.4; 404/15; 14/69.5
See application file for complete search history.

(56) References Cited

U.S. PATENT DOCUMENTS

| | | | |
|---|---|---|---|
| 1,838,746 A * | 12/1931 | Day .............................. | 104/275 |
| 2,299,356 A * | 10/1942 | Strohm et al. ................. | 104/275 |
| 3,357,370 A * | 12/1967 | Walkey .......................... | 104/275 |
| 3,503,425 A | 3/1970 | Holm | |
| 3,734,137 A | 5/1973 | Stanley | |
| 3,965,967 A | 6/1976 | Jentzsch et al. | |
| 5,267,367 A | 12/1993 | Wegmann, Jr. | |
| 5,385,431 A | 1/1995 | Topf, Jr. | |
| 5,566,622 A * | 10/1996 | Ziaylek et al. ................ | 104/275 |
| 5,755,527 A * | 5/1998 | Dufresne ....................... | 405/157 |
| 6,067,681 A | 5/2000 | Zeinstra et al. | |
| 6,202,565 B1 * | 3/2001 | Henry ........................... | 104/275 |
| 6,287,047 B1 * | 9/2001 | Dufresne ....................... | 404/15 |
| 2007/0277894 A1 | 12/2007 | Boone et al. | |

FOREIGN PATENT DOCUMENTS

| | | | | |
|---|---|---|---|---|
| DE | 10355089 B3 * | 5/2005 | ............. | F61L 1/024 |
| FR | 2943077 A1 * | 9/2010 | ............. | H02G 9/02 |
| GB | 485673 * | 5/1938 | | |
| GB | 550506 * | 1/1943 | | |

* cited by examiner

*Primary Examiner* — Frederick L Lagman
(74) *Attorney, Agent, or Firm* — Goldstein Law Offices, P.C.

(57) ABSTRACT

A device and a system for an oil field road crossing and a method of installing thereof. A plurality of conduits having a rectangular cross-section with a coupling header on each end are set in the ground at the road crossing, the conduit top surfaces substantially level with the ground. The long sides of adjacent conduits are welded together in parallel. The coupling headers are in fluid communication with the rectangular conduit, each header have an open end operative to connect to the end of a cylindrical pipeline. When cylindrical pipelines are connected to the headers, one at each end of the rectangular conduit, the pipelines are in fluid communication with each other. The flat surfaces of the rectangular conduits form a road crossing substantially level with the ground for a vehicle to safely travel over without disrupting flow through the pipelines absent burying the pipelines.

2 Claims, 6 Drawing Sheets

OILFIELD ROAD CROSSING

CROSS-REFERENCE TO RELATED APPLICATIONS

This application is a nonprovisional utility application of the provisional patent application Ser. No. 61/590,022 filed in the United States Patent Office on Jan. 24, 2012 and claims the priority thereof and is expressly incorporated herein by reference in its entirety.

TECHNICAL FIELD

The present disclosure relates generally to a road crossing system. More particularly, the present disclosure relates to a road crossing device and system for vehicles traveling in an oilfield and a method of installing thereof.

BACKGROUND

Oil fields are regions with an abundance of oil wells extracting crude oil from below ground. Because the oil reservoirs typically extend over a large area, possibly several hundred miles across, full exploitation entails multiple wells scattered across the area. In addition, there may be exploratory wells probing the edges, pipelines to transport the oil elsewhere, pipelines transporting drilling mud, panic lines.

A typical oil field resembles a small self-contained city in the midst of a landscape dotted with drilling rigs, pumping jacks and complicated infrastructure to convey gases and fluids across the terrain into storage or transport. Heavy construction equipment, large trucks and tankers are constantly traversing the field as new wells are drilled and product from existing wells is moved out to refineries. New roads are built to service the new wells.

Just as vehicles crisscross the field, pipelines and cables likewise crisscross the field. In the oil field, pipelines not only transport petroleum and natural gas, but also drilling mud. There are flare lines and panic lines. To accommodate the vehicular traffic and the pipelines and cables, the pipelines are buried below ground where their path crosses the roads. Buried pipeline is not accessible for inspection for damage and leaks.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a road crossing system operative for a vehicle to cross over a fluid conveying infrastructure. Accordingly, the present disclosure provides a plurality of rectangular conduits with a flat top surface substantially level with the ground for a vehicle to cross over a fluid-conveying infrastructure.

Another aspect of an example embodiment in the present disclosure is to provide a road crossing system for a vehicle to cross over a fluid-conveying infrastructure without burying the infrastructure below ground. Accordingly, the present disclosure provides a plurality of rectangular conduits with a flat top surface substantially level with the ground in fluid communication with a fluid conveying infrastructure above ground.

A further aspect of an example embodiment in the present disclosure is to provide a road crossing system for a vehicle to cross over a fluid-conveying infrastructure, while still permitting easy inspection of the infrastructure. Accordingly, the present disclosure provides a plurality of rectangular conduits with a flat top surface substantially level with the ground in fluid communication with a fluid conveying infrastructure above ground, permitting easy inspection thereof.

Yet another aspect of an example embodiment in the present disclosure is to provide a road crossing system operative for a vehicle to cross over a fluid conveying infrastructure without disrupting flow of the fluid. Accordingly, the present disclosure provides a plurality of rectangular conduits with a flat top surface substantially level with the ground in fluid communication with a fluid conveying infrastructure above ground, allowing a vehicle to cross over the fluid conveying infrastructure without disrupting flow of the fluid.

The present disclosure describes a device and a system for an oil field road crossing and a method of installing thereof. A plurality of conduits having a rectangular cross-section with a coupling header on each end are set in the ground at the road crossing, the conduit top surfaces substantially level with the ground. The long sides of adjacent conduits are welded together in parallel. The coupling headers are in fluid communication with the rectangular conduit, each header have an open end operative to connect to the end of a cylindrical pipeline. When cylindrical pipelines are connected to the headers, one at each end of the rectangular conduit, the pipelines are in fluid communication with each other. The flat surfaces of the rectangular conduits form a road crossing substantially level with the ground for a vehicle to safely travel over without disrupting flow through the pipelines absent burying the pipelines.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
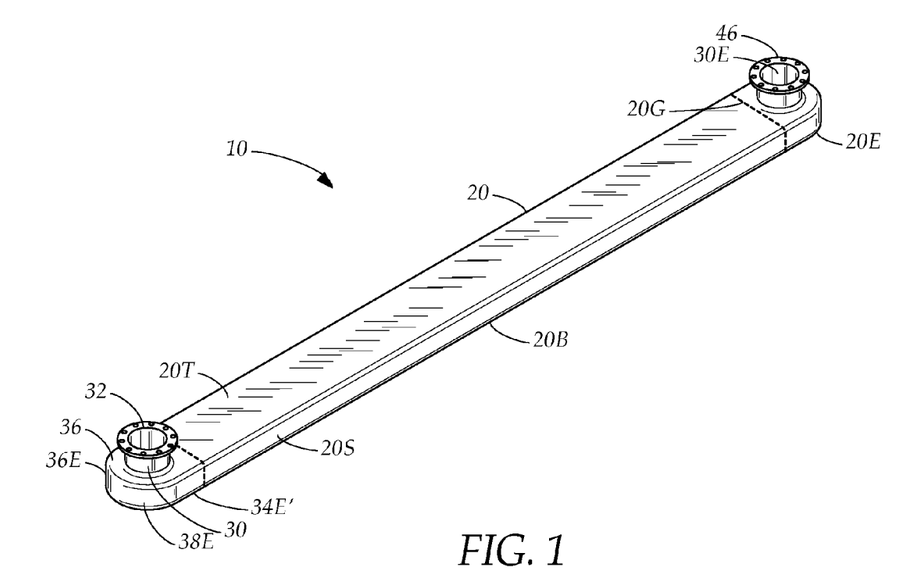
FIG. 1 is a diagrammatic perspective view of a rectangular conduit having a pair of ends, each end having a coupling header.

FIG. 1 illustrates a road crossing device 10 operative for a vehicle to cross over a conduit in an oil field. Oil fields have a fluid conveying infrastructure with pipelines carrying fluids, such as natural gas, petroleum and drilling mud, crisscrossing the oil field terrain. There are flare pipelines and panic pipelines. The current practice is to bury pipelines under ground at intervals to allow vehicles to transverse the oil field. The buried portions of pipelines are inaccessible for routine inspection. The road crossing device 10 sets on the ground and is accessible for inspection for cracks and leaks. The road crossing device 10 is operative for a vehicle to cross over the fluid conveying infrastructure without burying any portion of the pipeline.

Figure 2:
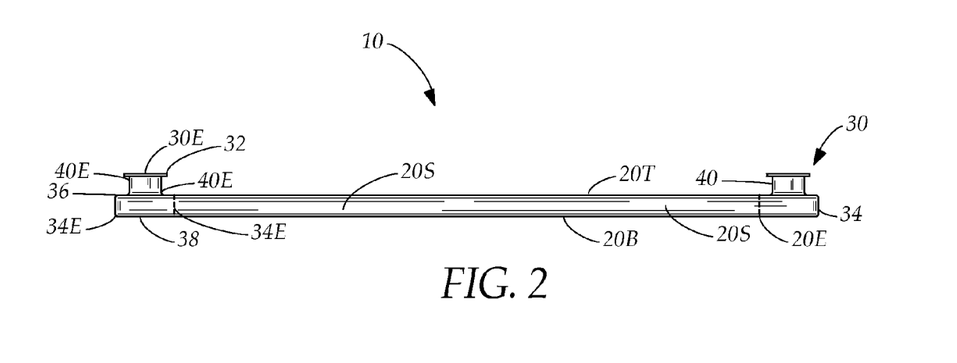
FIG. 2 is a side elevational view of the rectangular conduit having a coupling header at each end.

Referring to FIG. 1 and FIG. 2, the road crossing device has a rectangular conduit 20 having a rectangular cross-section, a pair of long sides 20S, a pair of ends 20E, a flat top surface 20T and a flat bottom surface 20B. The device is set on the ground with the flat top surface 20T substantially level with the ground surface so that a vehicle can cross over, rolling over the ground and road crossing device in a continuous manner.

The device 10 has a pair of coupling headers 30, one at each end 20E of the conduit 20. The coupling header 30 is welded to and in fluid communication with the rectangular conduit 20 forming a gas tight connection with the conduit 20, the coupling header sealing the ends 20E of the conduit. The header has an open end 20E having an annular collar 32. The annular collar 32 connects the device 10 to an above ground cylindrical pipeline. In one embodiment, the collar is threaded. In another embodiment the collar has a welded slip on flange 46. In one embodiment, one conduit connects with one coupling header.

The device 10 is preferably constructed from steel.

Figure 4:
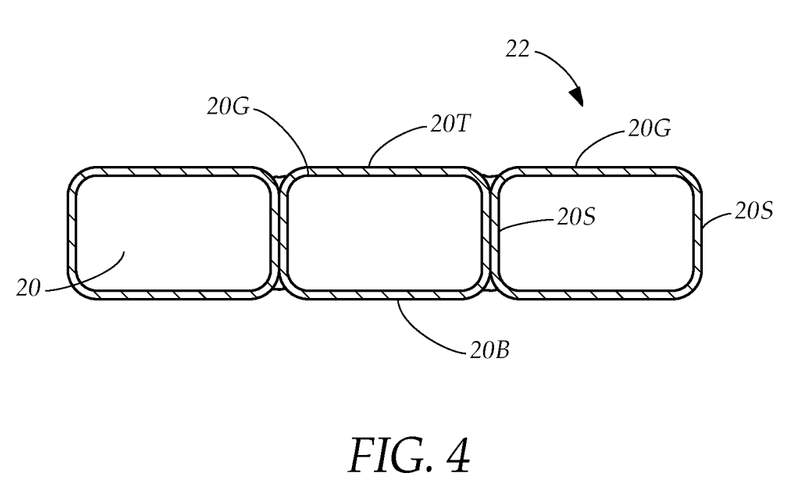
FIG. 4 is a cross-sectional view of a plurality of rectangular conduits welded together.

FIG. 4 shows the rectangular cross-section of a cluster 22 of conduits 20. The conduits are welded together along adjacent long sides 20S. The cross-section shown is at the end of the conduits 20, however, the cross-section is the same throughout the cluster, the conduits having a relatively regular rectangular shape in cross-section continuous on the long sides. Each conduit 20 has an edge 20G at the end of the conduit on the long sides 20S, top surface 20T and bottom surface 20B. In one embodiment, one conduit connects with one coupling header.

Referring again to FIG. 1 and FIG. 2, in one embodiment, the coupling header 30 includes a top plate 36 and a bottom plate 38, the plates each having an edge 36E, 38E. The top plate 36 of the header is welded to the edge of the top surface 20T of the rectangular conduit 20 and the bottom plate 38 is welded to the edge of the bottom surface 20B of the rectangular conduit. The top plate has an opening. The coupling header has a pipe 40 with a pair of ends 40E, a first end connecting to the annular collar 32 and second end connecting to the opening in the top plate 36. The coupling header 30 includes a side plate 34, the side plate having a pair of long edges 34E' and a pair of short edges 34E. A short edge is welded to the edge 20G at the ends of the sides of the rectangular conduit, one short edge on each side. One long edge 34E' of the side plate is welded to the edge of the top plate 20T of the coupling header and one long edge 34E' is welded to the edge of the bottom plate header 20B.

It is understood by those of ordinary skill, that there are other configurations of plates and pipe operative to form a welded gas tight seal with the rectangular conduit are possible and the configuration described hereinabove is one embodiment and that other embodiments are possible within the inventive concept.

In the embodiment illustrated in FIG. 1 and FIG. 2, the opening in the top plate 36 of the coupling header connects to the collar by a straight pipe 40. The collar is operative to couple to other connecting pipes such as, for example, but not limited to, an elbow pipe to connect to the above ground pipeline.

As described hereinabove, the plurality of conduit can be welded together to make the cluster of parallel welded conduits. In one embodiment, each conduit has the pair of ends and each end connects to one coupling header.

Figure 3:
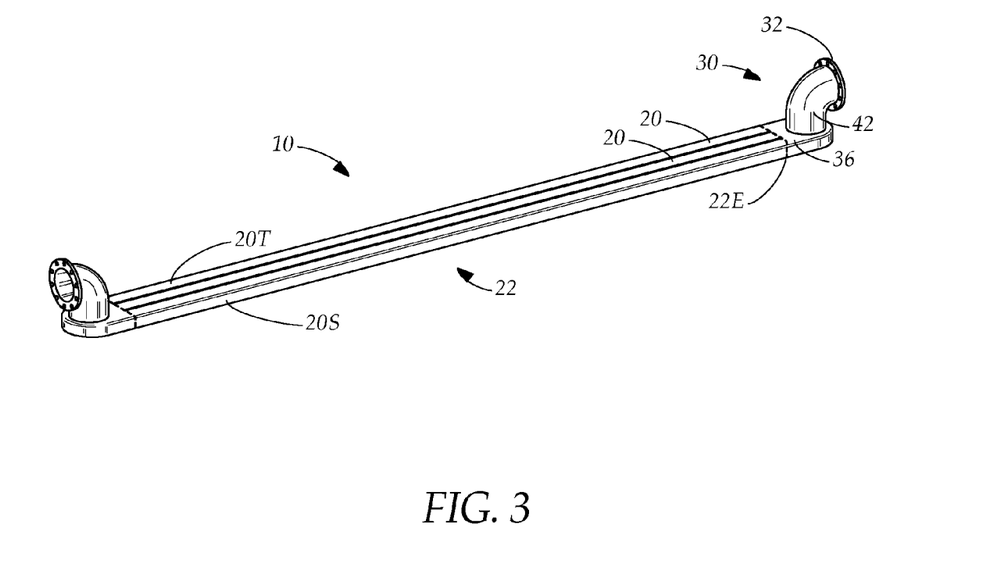
FIG. 3 is a diagrammatic perspective view of a plurality of rectangular conduits welded in parallel in fluid communication with the pair of coupling headers each having a right angle elbow.

As illustrated in FIG. 3, the device 10 has a plurality of rectangular conduits 20 in a parallel position, the long side 20S of each conduit 20 welded in the parallel position to the long side of an adjacent conduit forming a cluster 20. The top surfaces 20T of the conduits are substantially level with the ground surface when the device is set on the ground at the road crossing.

In the embodiment illustrated in FIG. 3, the cluster of parallel welded conduits has a pair of ends and each cluster end 22E connects to one coupling header 30.

FIG. 3 also shows the coupling header 30 have an integral right-angle elbow pipe 42 connecting the opening on the top plate 36 of the header and the collar.

Figure 6:
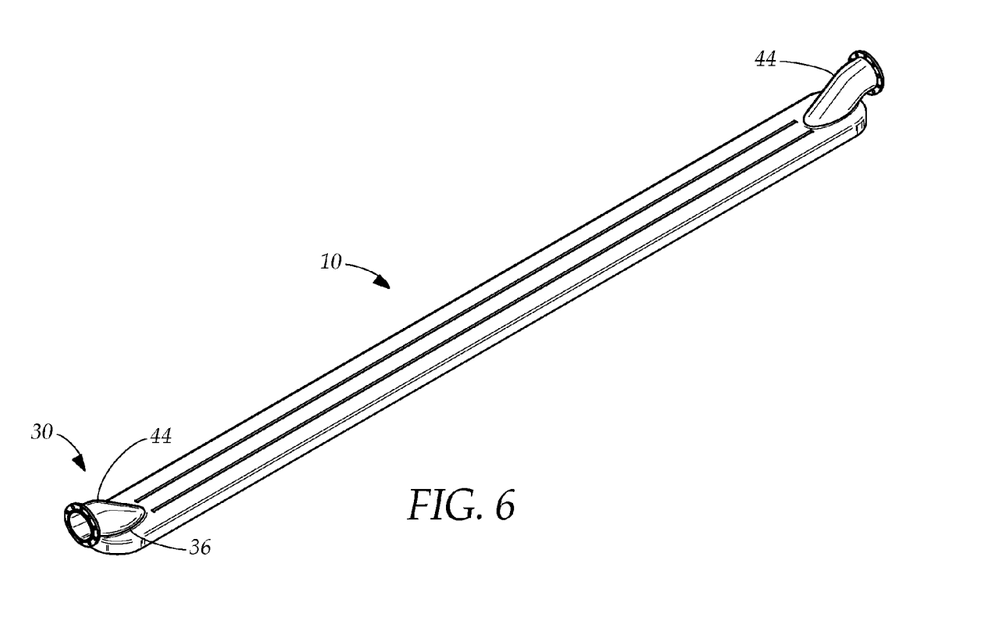
FIG. 6 is a diagrammatic perspective view of the rectangular conduit having a low-profile coped coupling header at each end.
Figure 7:
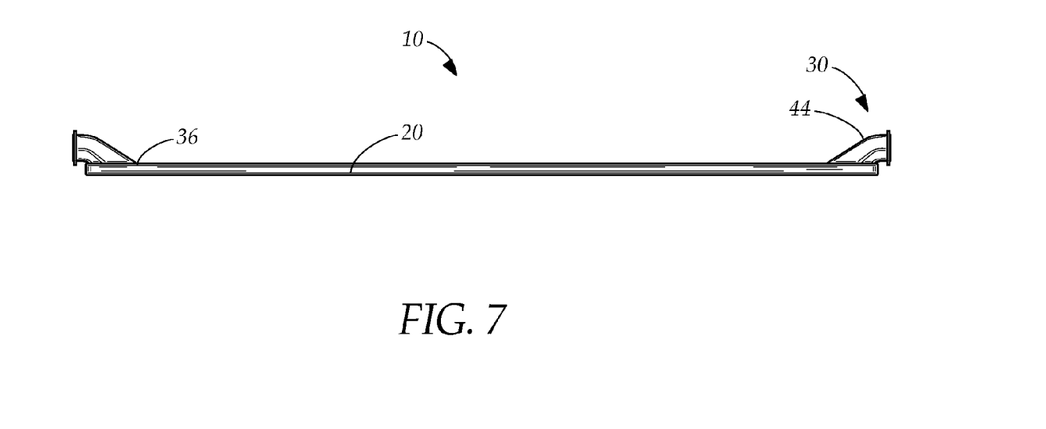
FIG. 7 is a side elevational view of the rectangular conduit having a low-profile coped coupling header at each end.

FIG. 6 and FIG. 7 shows the coupling header 30 having a coped pipe 44. The pipe 44 is coped in at an acute angle with the top plate 36 so that the coupling header 36 maintains a low profile to the ground when the road crossing device 10 is installed. FIG. 6 shows the coupling header connecting to the plurality of conduit.

Figure 8:
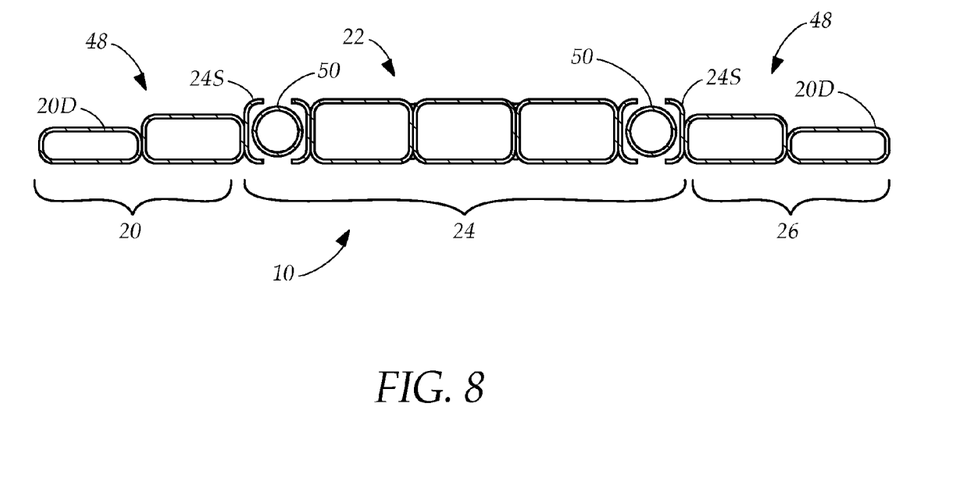
FIG. 8 is a cross-sectional view of a plurality of rectangular conduits welded together, a pair of conduits having a cylindrical pipeline therethrough.

A further embodiment of the road crossing device 10 is shown in FIG. 8. The cluster 22 of conduits has a center portion 24 of conduits having a pair of sides 24S and a pair of side portions 26 connecting to the side 24S of the center portion, one side portion 26 on each side. The side portion conduits having decrementally shorter sides, the conduit 20D with the shortest side positioned farthest from the center portion 24, such that the top surfaces 20T of the side portions decline away from the center portion 24, forming a pair of ramps 48 on each side of the center portion 24. In this embodiment, the road crossing device sits on the ground, the top surface of the conduit with the shortest side level with the ground surface.

Another embodiment of the conduit is shown in FIG. 8. A cylindrical pipeline 50 is inside the rectangular conduit 20 therethrough. The cylindrical pipeline 50 is shown in cross-section in the drawing. The cylindrical pipeline 50 has an integral coupling header, which is not shown, operative for directly connecting to cylindrical piping, such as, for a non-limiting example, another cylindrical pipeline or piping connector.

Figure 5:
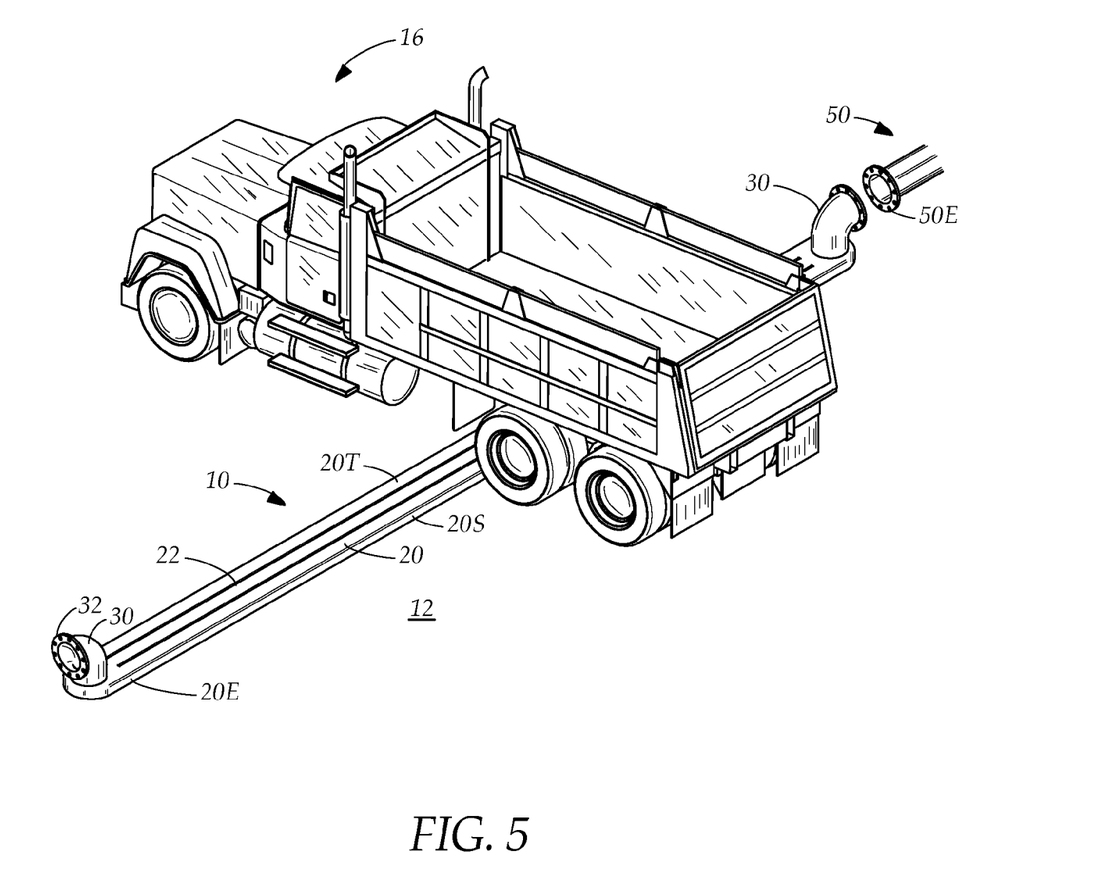
FIG. 5 is a perspective view of an oil field vehicle crossing over the road crossing device.

A system for crossing a road by a vehicle in an oil field is drawn in FIG. 5. The oil field has a plurality of cylindrical pipelines above ground and adjacent to the road crossings. The pipelines 50 each having an open end 50E.

The system includes a road crossing device 10. The device has a rectangular conduit 20 set on the oil field ground 12 at the road crossing where a vehicle 16 traverses the oil field. The steel conduit a rectangular cross-section and the pair of long sides 20S. In one embodiment, a plurality of conduits 20 are set on the ground with the long side of each conduit welded in a parallel position to the long side of the adjacent conduit forming a cluster 22. The cluster has a pair of ends 22E, a flat top surface 20T. The top surfaces of the conduits 20 are substantially level with the ground surface 12.

The device of the system has a plurality of coupling headers 30 at each end of the rectangular conduit 20. The coupling header 30 is welded to and in fluid communication with the rectangular conduit 20. The coupling header has an open end with annular collar. The annular collar 32 of the header couples to the open end of the cylindrical pipeline 50. When the annular collar 32 at the second end of the conduit connects to the open end of another pipeline, the cylindrical pipeline is in fluid communication with the conduit 20 and the second cylindrical pipeline. The flat top surfaces 20T of the rectangular conduits 20 form a surface substantially level with the ground surface 12 for the vehicle 16 to safely travel over, crossing a road without disrupting the flow of a plurality of fluids through the cylindrical pipelines, the pipelines 50 remaining above ground.

In one embodiment of the system, the collar 32 is threaded. In another embodiment the collar has a welded slip on flange 46 as shown in FIG. 1. In one embodiment, one conduit connects with one coupling header as shown in FIG. 1.

The device 10 of the system is preferably constructed from steel.

One embodiment of the connection between the conduit of the system and the coupling header is described hereinabove in FIG. 1, FIG. 2 and FIG. 3. The configurations of the welds between the coupling header and the rectangular conduit are gas tight, providing a gas tight device when coupled to pipelines in the system. In one embodiment, the coupling header 30 in the system has a right-angle elbow 42. In a further embodiment, as shown in FIG. 6, the pipe 44 of the coupling header 30 is coped in at an acute angle, the coupling header maintaining a low profile to the ground when the system is in place.

A method for installing a road crossing device for a vehicle to cross over a plurality of conduits in an oil field is shown in FIG. 5. The device 10, as described hereinabove, has rectangular conduits 20 and coupling headers 30.

The long sides of rectangular conduits 20 are welded together in a parallel position, the long side 20S of one conduit welded to the adjacent long side of another conduit. The coupling headers 30 are welded to each end 20E of the each rectangular conduit 20. The coupling header 30 is in fluid communication with the rectangular conduit 20.

The welded conduits with coupling headers forming the road crossing device 10 are set on the oil field ground 12, the top surfaces 20T of the conduits substantially level with the ground surface when the device is set at a road crossing.

The coupling headers 30 of the conduits are connected to above ground cylindrical pipelines 50 adjacent to the road crossing, a cylindrical pipeline connecting at each end of a rectangular conduit. The annular collars 32 of the coupling headers 30 are operative to form a gas tight connection with the cylindrical pipelines 50, the cylindrical pipelines in fluid communication with the rectangular conduits 20. The flat surface of the device 10 allows the vehicle 16 to safely travel over the crossing without disrupting the flow of fluids through the adjacent above ground pipelines without having to bury the pipelines below ground.

As shown in FIG. 6, in a further embodiment, the step of welding the coupling header 30 to the rectangular conduit 20 includes the step of coping the pipe 44 to the conduit at an acute angle, the coupling header maintaining a low profile to the ground.

The embodiments of the system, device and method of the present disclosure have been discussed in terms of oil fields as non-limiting examples. Those of ordinary skill will understand that the system, device and method are further useful in other industrial open-style fields and defined areas, such as, for example, but not limited to, airports, tank farms, and other fields that have above ground piping, including those areas that elevate pipelines, providing high clearance at road crossings.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a device and a system for an oil field road crossing and a method of installing thereof. The disclosure is illustrated by example in the drawing figures, and throughout the written description. It should be understood that numerous variations are possible, while adhering to the inventive concept. Such variations are contemplated as being a part of the present disclosure.

What is claimed is:

1. A road crossing device operative for a vehicle to cross over a conduit in an oil field, comprising:
   a rectangular conduit having a rectangular cross-section, a pair of long sides, a flat top surface and a flat bottom surface, and a pair of ends having an edge at the end of the conduit on the conduit sides, on the top surface, and on the bottom surface, wherein a cylindrical pipeline is inside the rectangular conduit therethrough, the cylindrical pipeline having an integral coupling header operative for connecting to another cylindrical pipeline above ground; and
   a pair of coupling headers, a coupling header at each end of the rectangular conduit, each coupling header includes a top plate and a bottom plate, the plates each having an edge, the top plate of each header welded to and in fluid communication with the edge of the top surface of the rectangular conduit and the bottom plate of each header welded to and in fluid communication with the edge of the bottom surface of the rectangular conduit, the welded headers forming a gas tight connection with the conduit, each top plate having an opening to which is coupled a pipe with a pair of ends, a first end connecting to an annular collar, and a second end connecting to the opening in each top plate, the annular collar operative for selectively connecting to a cylindrical pipeline above ground when the device is set on the ground, the headers including a side plate, the side plates having a pair of long edges and a pair of short edges, each short edge welded to the edges at the ends of the sides of the rectangular conduit, one short edge on each opposing sides, one long edge of the side plate welded to the edges of the top plates of the headers and one long edge welded to the edges of the bottom plate headers, the device having the flat top surface of the conduit substantially level with the ground, the device set at a road crossing for a vehicle to safely travel over without disrupting the flow of a fluid through the cylindrical pipeline above ground adjacent to the road crossing, the pipeline selectively connecting to the coupling headers.

2. The road crossing device as described in claim 1, wherein the device has a plurality of rectangular conduits in a parallel position, the long side of each conduit welded in the parallel position to the long side of an adjacent conduit, the parallel welded conduits forming a cluster, wherein the cluster of conduits has a center portion of conduits having a pair of sides and a pair of side portions, the side portions connected to the side of the center portion, one side portion on each side, the side portion conduits having decrementally shorter sides, the conduit with the shortest side positioned farthest from the center portion, such that the top surfaces of the side portions decline away from the center portions, forming a pair of ramps on each side of the center portion.

* * * * *